US010860431B2

(12) United States Patent
Singhal et al.

(10) Patent No.: US 10,860,431 B2
(45) Date of Patent: Dec. 8, 2020

(54) SYSTEM AND METHOD FOR FAULT TOLERANT BACKUP GENERATION IN A VIRTUAL ENVIRONMENT

(71) Applicant: EMC IP Holding Company LLC, Hopkinton, MA (US)

(72) Inventors: Upanshu Singhal, Bangalore (IN); Shivakumar Onkarappa, Bangalore (IN); Chakraveer Singh, Bangalore (IN); Archit Seth, Bangalore (IN); Chandra Prakash, Bangalore (IN); Pradeep Mittal, Karnal (IN); Kumari Priyanka, Bengaluru (IN); Rahul Bhardwaj, Udaipur (IN); Akansha Purwar, Bangalore (IN); Lalita Dabburi, Bangalore (IN); Shilpa Mehta, Bangalore (IN); Shelesh Chopra, Bangalore (IN); Manish Sharma, Bangalore (IN); Asif Khan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 222 days.

(21) Appl. No.: 16/028,672

(22) Filed: Jul. 6, 2018

(65) Prior Publication Data

US 2020/0012571 A1 Jan. 9, 2020

(51) Int. Cl.
*G06F 17/00* (2019.01)
*G06F 11/14* (2006.01)
*G06F 9/455* (2018.01)

(52) U.S. Cl.
CPC ...... *G06F 11/1461* (2013.01); *G06F 9/45558* (2013.01); *G06F 2009/45583* (2013.01); *G06F 2201/815* (2013.01)

(58) Field of Classification Search
None
See application file for complete search history.

(56) References Cited

U.S. PATENT DOCUMENTS

| 8,713,376 | B1 * | 4/2014 | Makin | G06F 11/1461 |
| | | | | 714/47.1 |
| 9,471,441 | B1 * | 10/2016 | Lyadvinsky | G06F 11/1461 |
| 9,977,704 | B1 * | 5/2018 | Chopra | G06F 11/1464 |
| 2008/0270838 | A1 * | 10/2008 | Dorai | G06F 11/1461 |
| | | | | 714/38.14 |
| 2009/0216816 | A1 * | 8/2009 | Basler | G06F 11/1464 |

(Continued)

*Primary Examiner* — Hasanul Mobin
(74) *Attorney, Agent, or Firm* — Chamberlain, Hrdlicka, White, Williams & Aughtry

(57) ABSTRACT

An agent for managing virtual machines includes a persistent storage and a processor. The persistent storage stores backup/restoration policies. The processor identify an end of a backup generation session for the virtual machines; make a first determination that the backup generation was a batch type backup session and, in response to the first determination, performs a batch level continuity analysis of backups generated via the backup generation session to identify a set of backup failures of the backup generation session; performs an unscheduled batch backup generation session based on the identified set of backup failures; and remediates the backup/restoration policies using the identified set of backup failures to ensure backup continuity of all backups associated with each of the virtual machines.

19 Claims, 13 Drawing Sheets

(56) References Cited

U.S. PATENT DOCUMENTS

| | | | | |
|---|---|---|---|---|
| 2010/0211821 A1* | 8/2010 | Donie | .................. | G06F 11/2097 |
| | | | | 714/6.11 |
| 2011/0302140 A1* | 12/2011 | Gokhale | ............. | G06F 11/2023 |
| | | | | 707/645 |
| 2012/0110584 A1* | 5/2012 | Chaudhry | ............. | G06F 9/5027 |
| | | | | 718/102 |
| 2012/0278525 A1* | 11/2012 | Serebrin | ............. | G06F 11/1464 |
| | | | | 711/6 |
| 2013/0024598 A1* | 1/2013 | Serebrin | ............. | G06F 12/1036 |
| | | | | 711/6 |
| 2013/0191320 A1* | 7/2013 | Avritzer | .................. | G06N 7/005 |
| | | | | 706/52 |
| 2014/0201564 A1* | 7/2014 | Jagtiani | .................. | G06F 11/203 |
| | | | | 714/4.11 |
| 2014/0281700 A1* | 9/2014 | Nagesharao | ............ | H04L 69/40 |
| | | | | 714/15 |
| 2015/0074458 A1* | 3/2015 | Atluri | .................. | G06F 11/1453 |
| | | | | 714/19 |
| 2017/0351581 A1* | 12/2017 | Bakshan | ............. | G06F 11/1464 |
| 2020/0012570 A1* | 1/2020 | Singhal | ............... | G06F 11/0751 |

\* cited by examiner

SYSTEM AND METHOD FOR FAULT TOLERANT BACKUP GENERATION IN A VIRTUAL ENVIRONMENT

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

BRIEF DESCRIPTION OF DRAWINGS

In one aspect, an agent for managing virtual machines in accordance with one or more embodiments of the invention includes a persistent storage and a processor. The persistent storage stores backup/restoration policies. The processor identify an end of a backup generation session for the virtual machines; make a first determination that the backup generation was a batch type backup session and, in response to the first determination, performs a batch level continuity analysis of backups generated via the backup generation session to identify a set of backup failures of the backup generation session; performs an unscheduled batch backup generation session based on the identified set of backup failures; and remediates the backup/restoration policies using the identified set of backup failures to ensure backup continuity of all backups associated with each of the virtual machines.

In one aspect, a method for managing virtual machines in accordance with one or more embodiments of the invention includes identifying an end of a backup generation session for the virtual machines; making a first determination that the backup generation was a batch type backup session and, in response to the first determination, performing a batch level continuity analysis of backups generated via the backup generation session to identify a set of backup failures of the backup generation session; performing an unscheduled batch backup generation session based on the identified set of backup failures; and remediating the backup/restoration policies using the identified set of backup failures to ensure backup continuity of all backups associated with each of the virtual machines.

In one aspect, a non-transitory computer readable medium in accordance with one or more embodiments of the invention includes computer readable program code, which when executed by a computer processor enables the computer processor to perform a method for managing virtual machines. The method includes identifying an end of a backup generation session for the virtual machines; making a first determination that the backup generation was a batch type backup session and, in response to the first determination, performing a batch level continuity analysis of backups generated via the backup generation session to identify a set of backup failures of the backup generation session; performing an unscheduled batch backup generation session based on the identified set of backup failures; and remediating the backup/restoration policies using the identified set of backup failures to ensure backup continuity of all backups associated with each of the virtual machines.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

Figure 1:
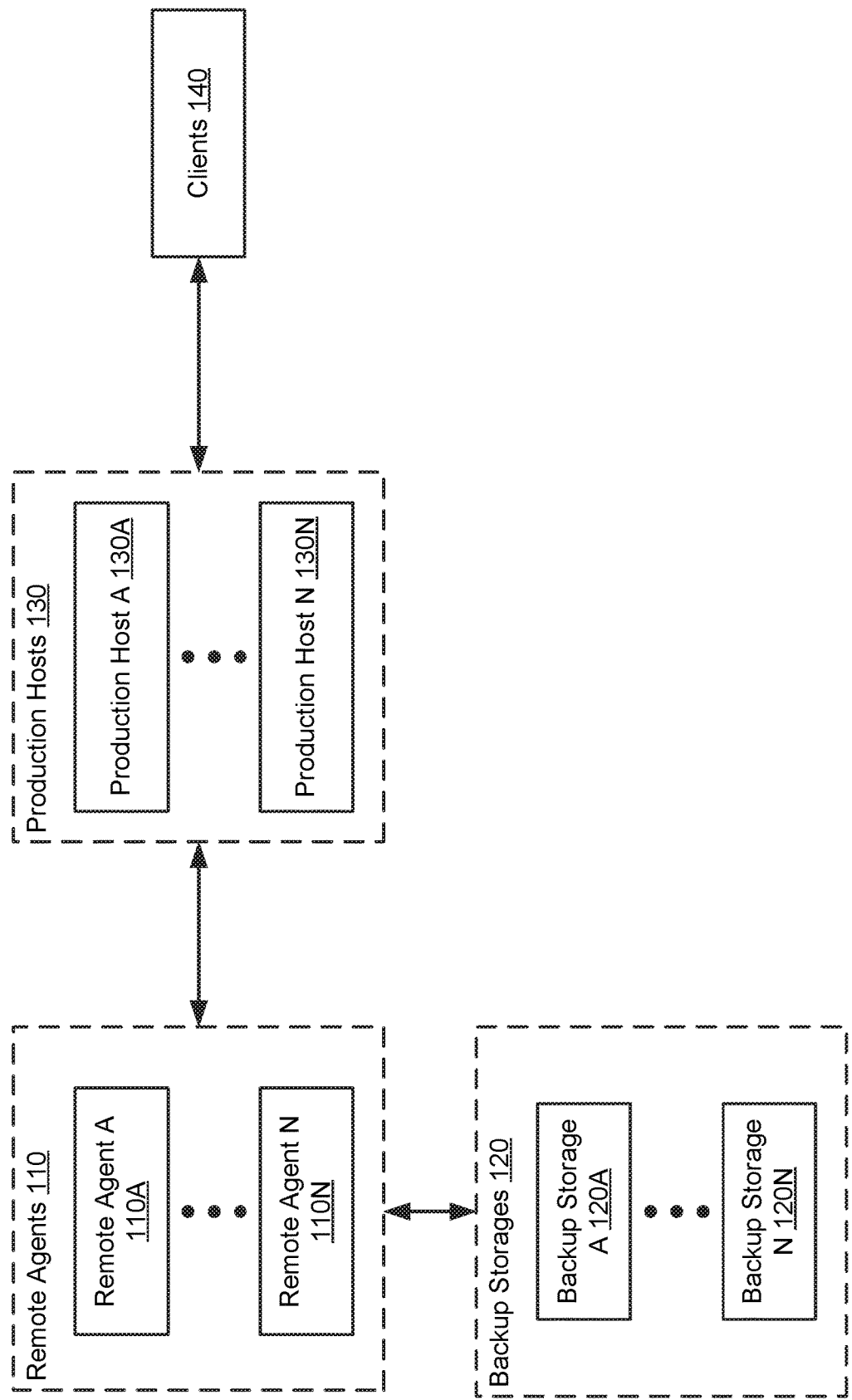

FIG. 1 shows a diagram of a system in accordance with one or more embodiments of the invention.

Figure 2:
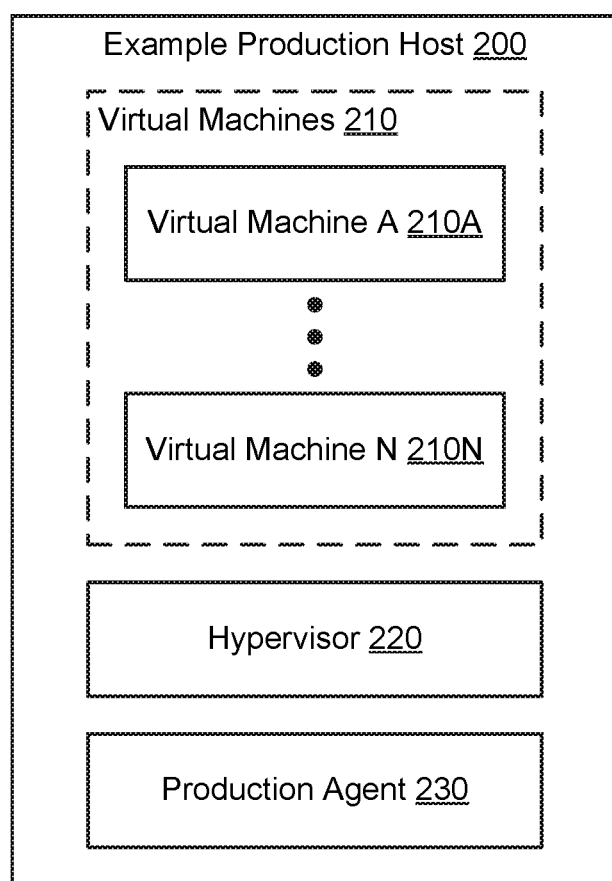

FIG. 2 shows a diagram of an example production host in accordance with one or more embodiments of the invention.

Figure 3:
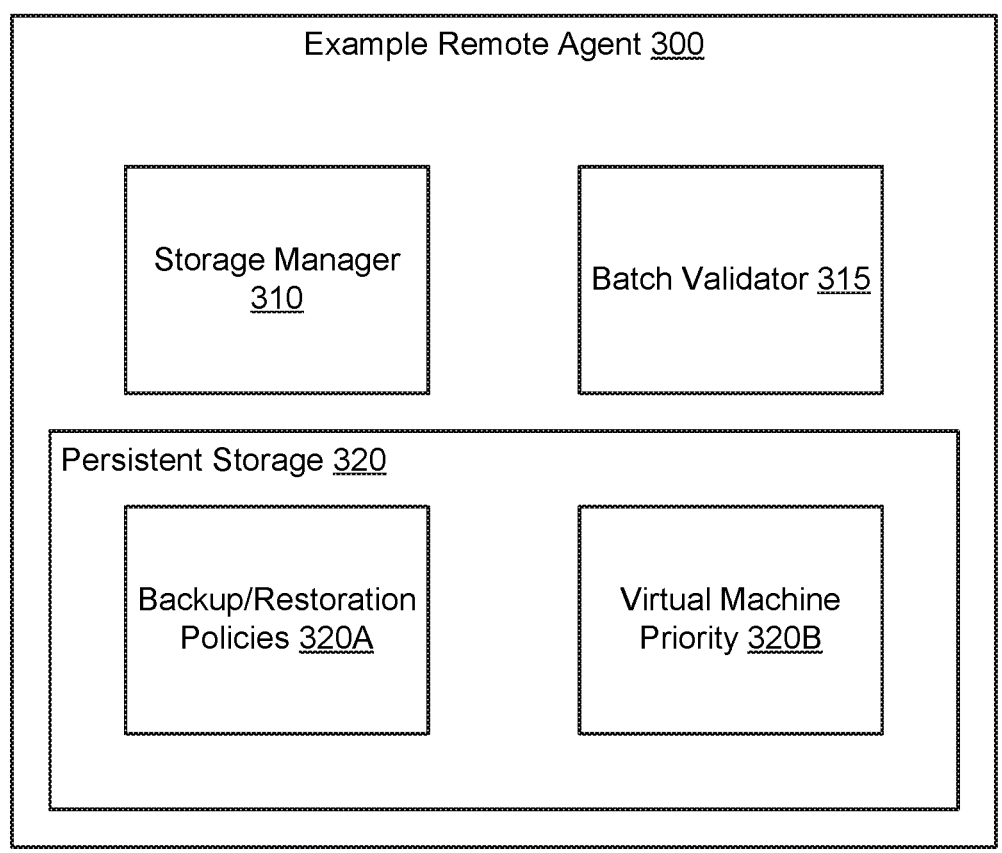

FIG. 3 shows a diagram of an example backup/restoration agent in accordance with one or more embodiments of the invention.

Figure 4:
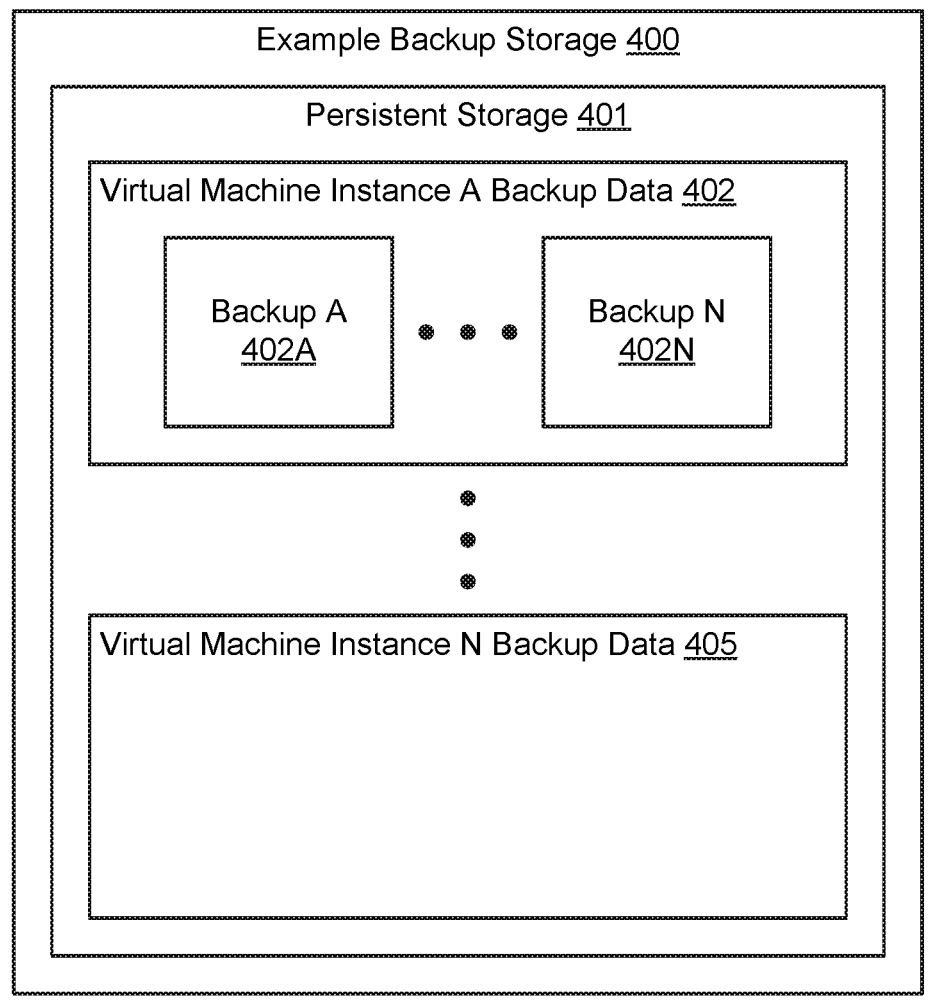

FIG. 4 shows a diagram of an example backup storage in accordance with one or more embodiments of the invention.

Figure 5:
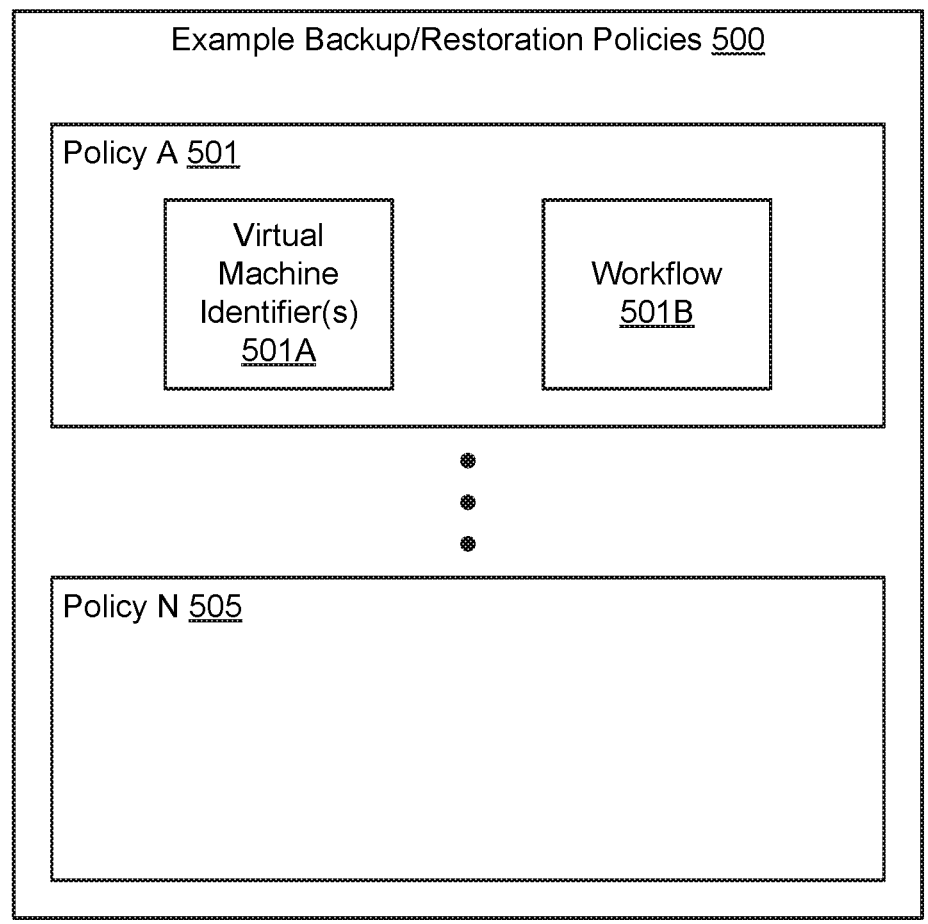

FIG. 5 shows a diagram of example backup/restoration policies in accordance with one or more embodiments of the invention.

Figure 6A:
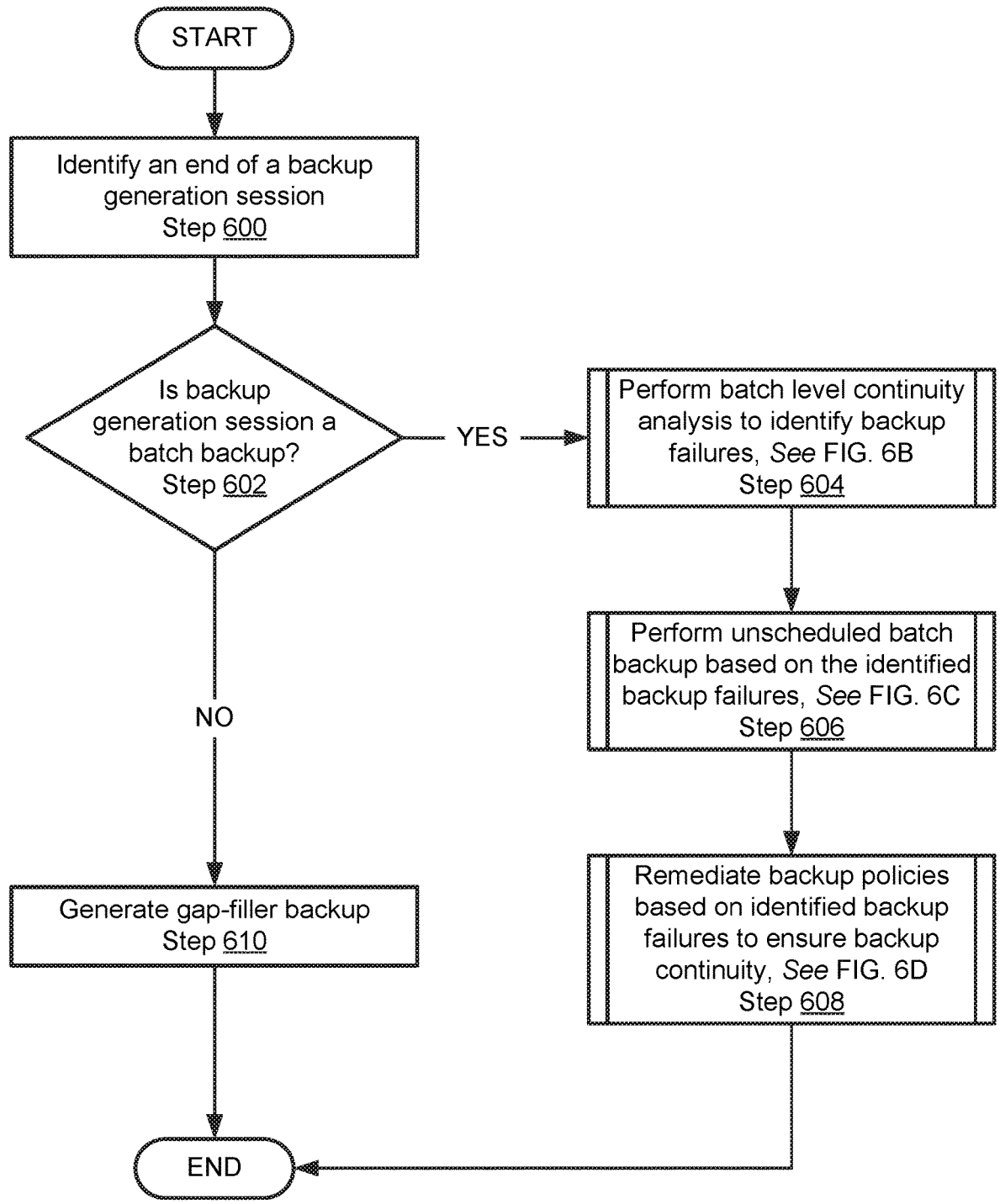

FIG. 6A shows a flowchart of a method of managing virtual machines in accordance with one or more embodiments of the invention.

Figure 6B:
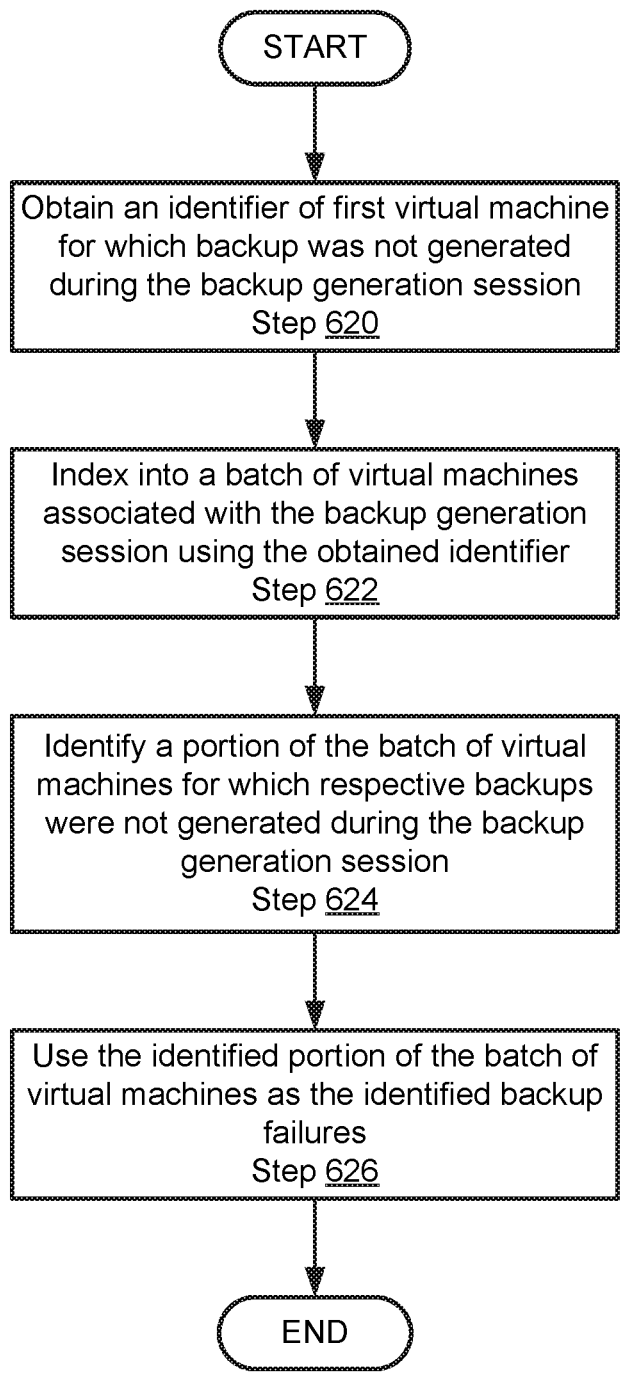

FIG. 6B shows a flowchart of a method of performing batch level continuity analysis in accordance with one or more embodiments of the invention.

Figure 6C:
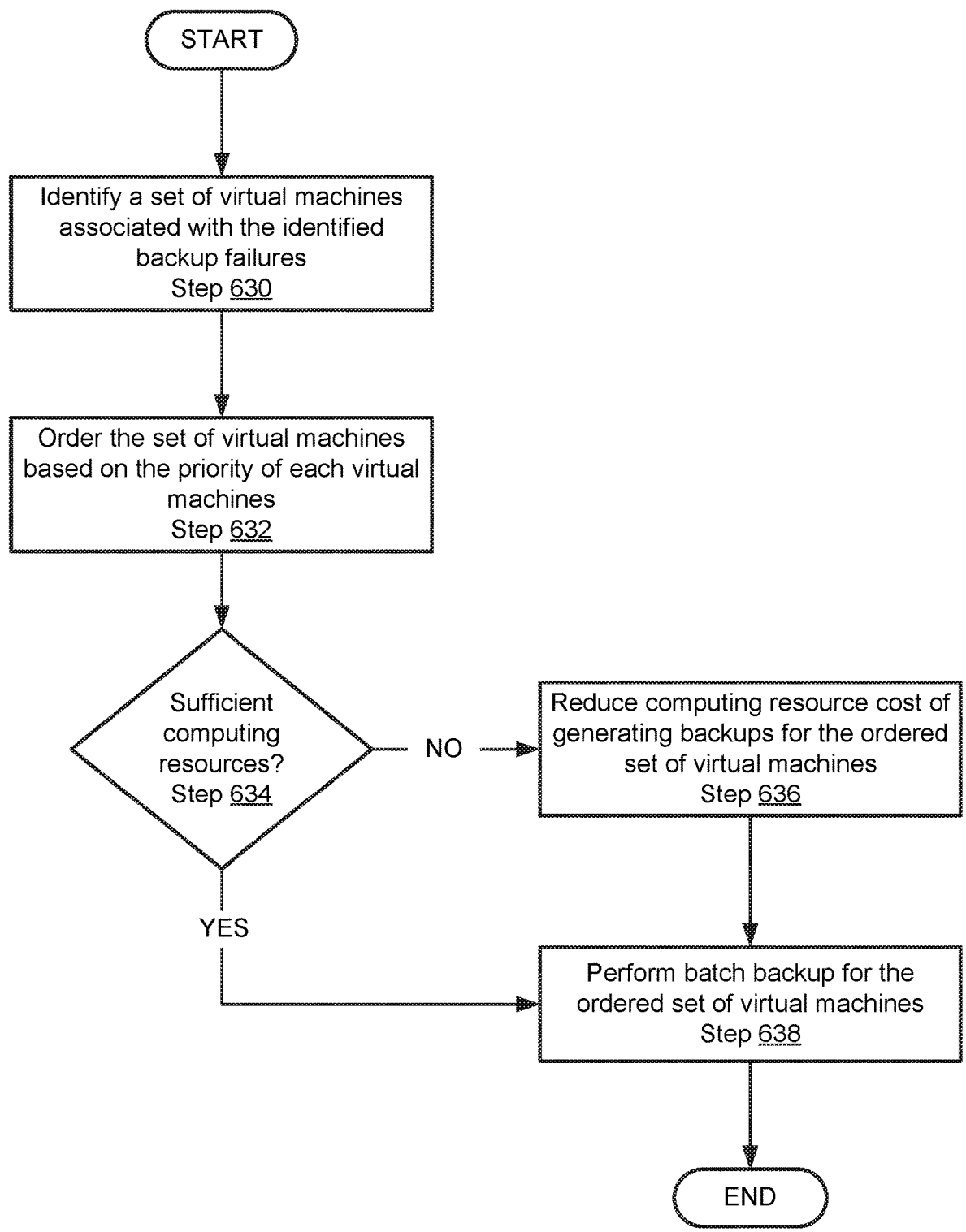

FIG. 6C shows a flowchart of a method of performing an unscheduled batch backup in accordance with one or more embodiments of the invention.

Figure 6D:
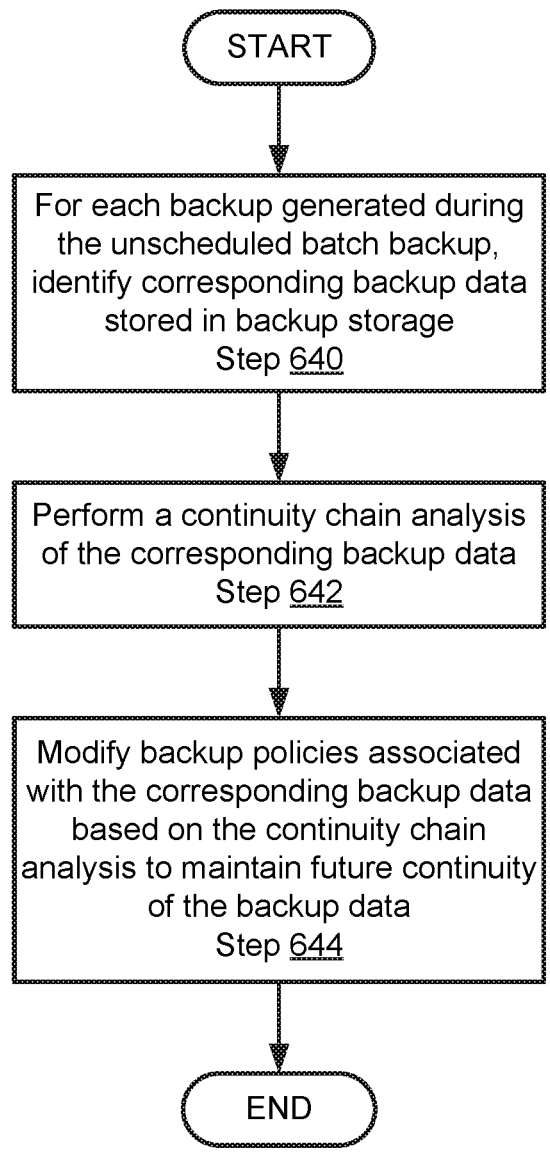

FIG. 6D shows a flowchart of a method of remediating backup policies in accordance with one or more embodiments of the invention.

Figure 7A:
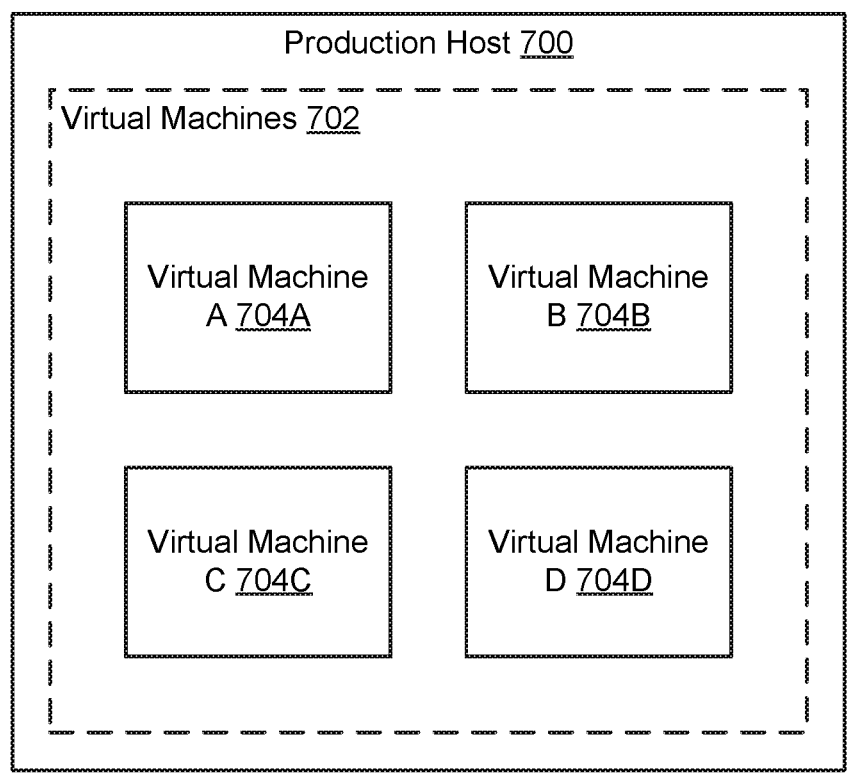

FIG. 7A shows a diagram of an example production host at a first point in time.

Figure 7B:
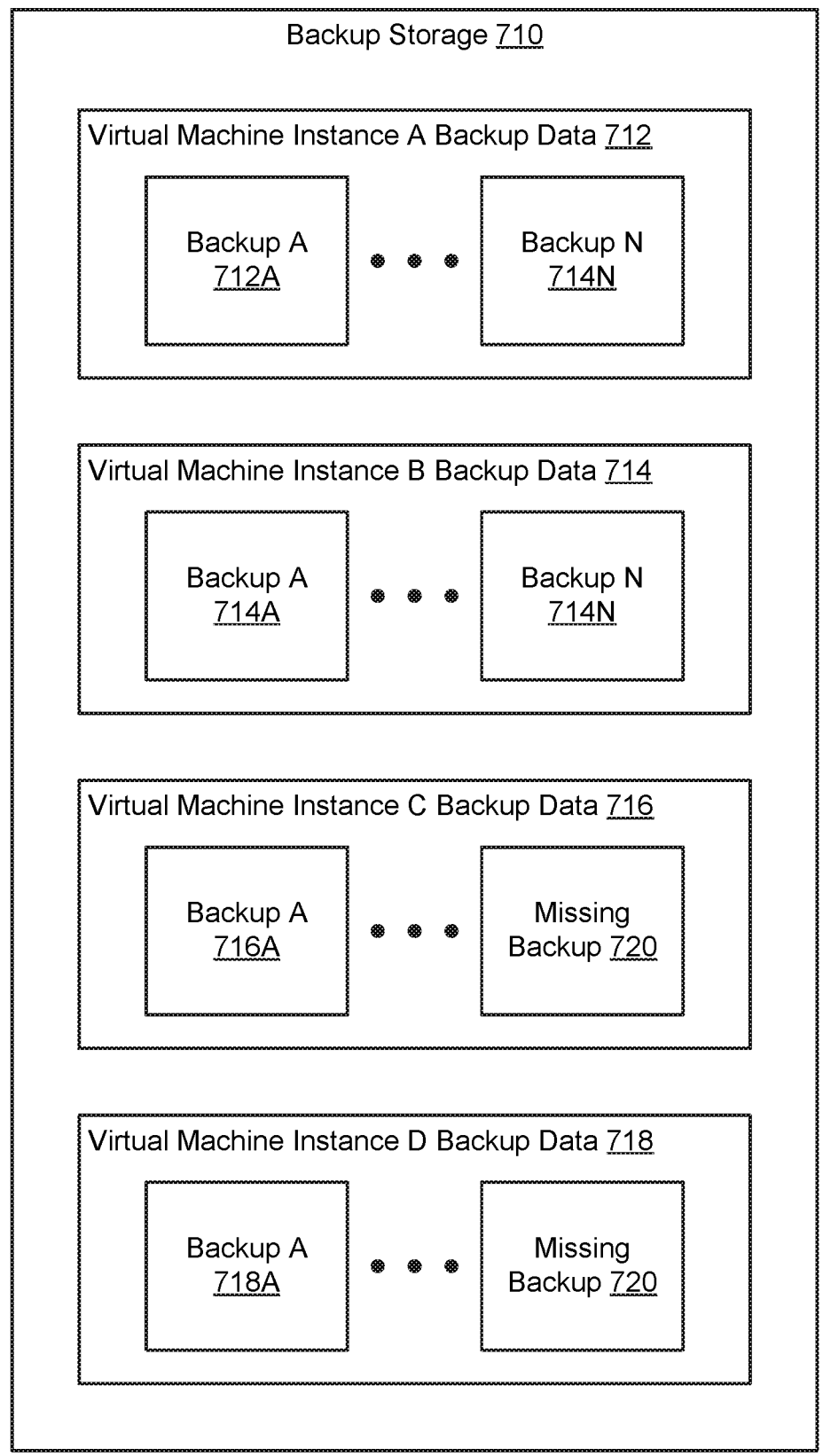

FIG. 7B shows a diagram of an example backup storage storing backup for virtual machines hosted by the production host of FIG. 7A.

Figure 7C:
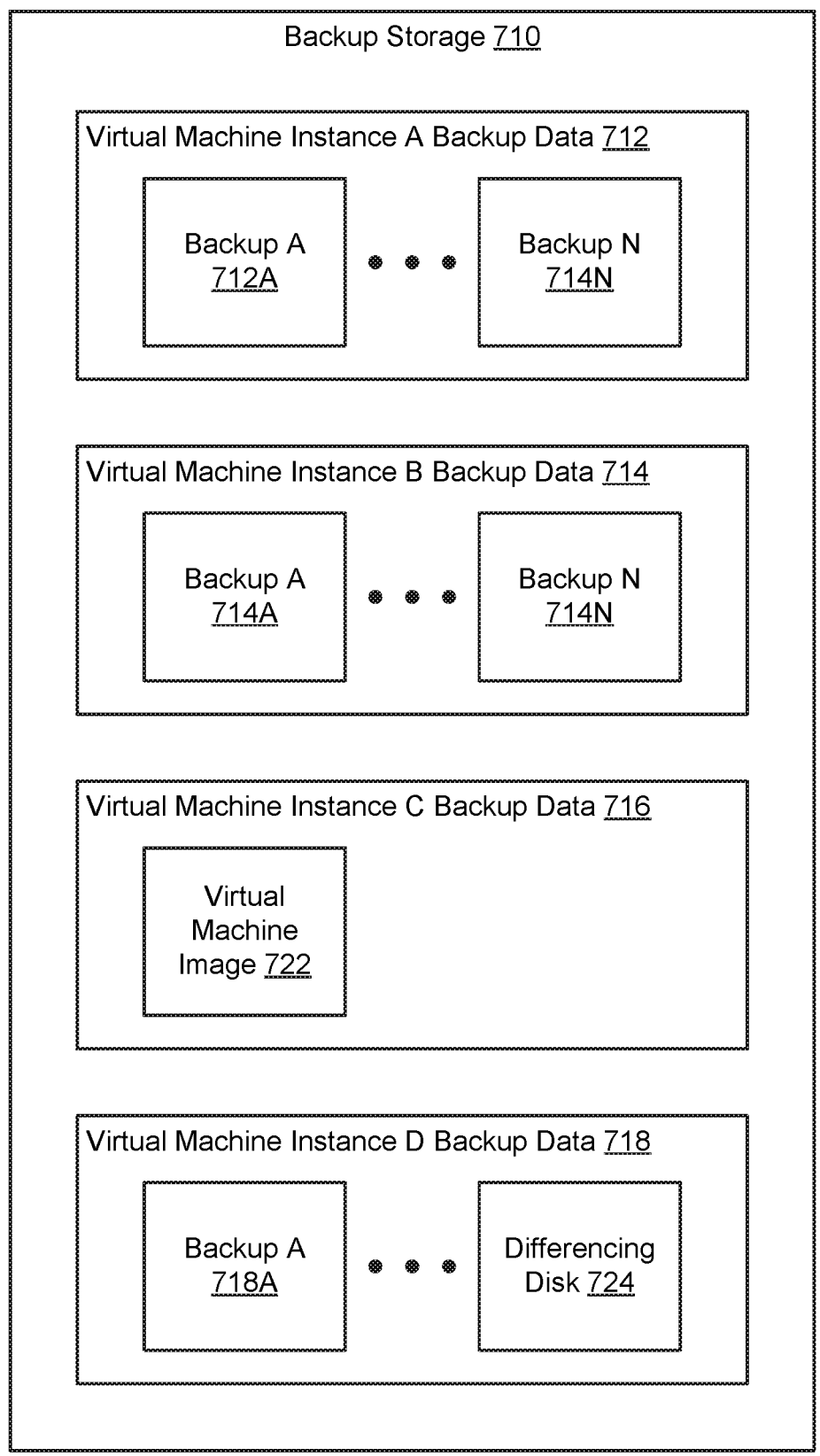

FIG. 7C shows a diagram of the example backup storage of FIG. 7B after an unscheduled batch backup is performed.

Figure 8:
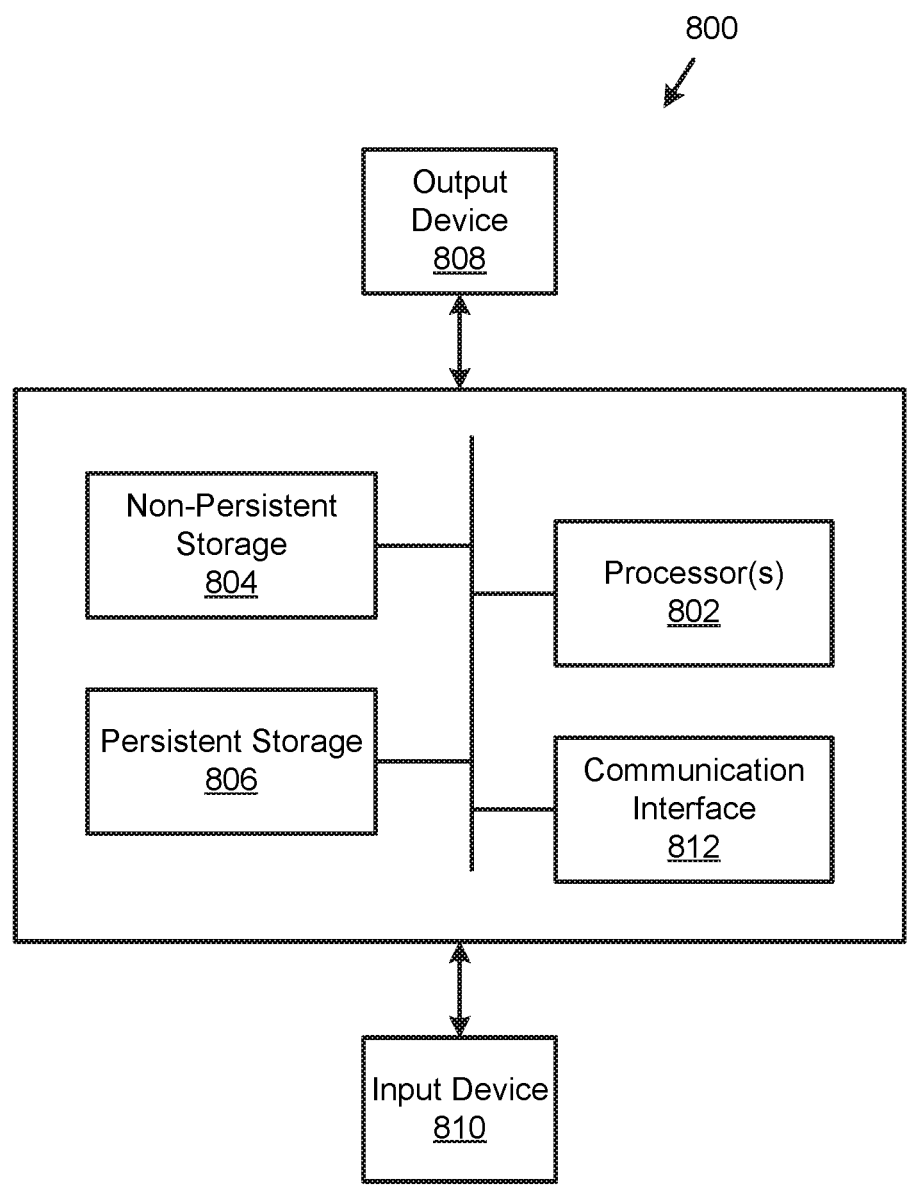

FIG. 8 shows a diagram of a computing device in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing virtual machines.

More specifically, the systems, devices, and methods may provide backup and restoration services to virtual machines executing on production hosts.

In one or more embodiments of the invention, a batch of backups for multiple virtual machines is performed. Due to unforeseeable events, a portion of the backups of the batch may not be generated. Embodiments of the invention may provide a mechanism for automatically remediating batch backup failures.

In one or more embodiments of the invention, the system automatically performs an unscheduled batch backup when a batch backup failure is detected. Doing so reduces the likelihood of data loss caused by virtual machines failures.

In one or more embodiments of the invention, the system detects a batch backup failure remotely, e.g., a component that is remote from a second component that is generating the backups detects the batch backup failure.

In one or more embodiments of the invention, the system automatically remediates existing backup and restoration policies, after performing an unscheduled batch backup, to ensure the continuity of backups associated with each of the virtual machines. Doing so may decrease the likelihood of backups scheduled for generation in the future from being unusable for restoration purposes.

In this manner, one or more embodiments of the invention may address the problem of batch backup failures in a distributed computing environment that would otherwise impair the ability of the distributed environment to perform its function of ensuring the reliability, through restoration, of executing virtual machines. As will be discussed in greater detail below, embodiments may address multiple, additional problems beyond that of batch backup failure in a distributed system.

FIG. 1 shows an example system in accordance with one or more embodiments of the invention. The system may include production hosts (130) that host virtual machines exposed to clients (140). The system may further include remote agents (110) that provide services to the production hosts. The services may include data storage in backup storages (120) and restorations of virtual machines using the data stored in the backup storages (120). In one or more embodiments of the invention, multiple backups and/or restorations may be aggregated into batch. In such a scenario, multiple backups may be generated and stored in backup storage as part of backup services provided to the production hosts. In one or more embodiments of the invention, the system of FIG. 1 may automatically take action to remediate failures as part of a batch backup process. The remediation actions may include automatically initiating additional backups sessions and modifying existing backup workflows to ensure continuity of the backups in the backup storages (120). Each component of the system of FIG. 1 may be operably connected via any combination of wired and wireless connections. Each component of the system is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (140) may be other types of computing devices without departing from the invention. For additional details regarding computing devices, See FIG. 8.

The clients (140) may interact with virtual machines hosted by the production hosts (130). For example, the virtual machines may host databases, email servers, or any other type of application. The clients (140) may utilize services provided by these or other applications. In another example, the clients (140) may directly operate the virtual machines, e.g., a virtualized environment. In such a scenario, the clients (140) may operate as terminals for accessing the virtual machines. By interacting with the virtual machines and hosted applications, data that is important to the clients may be stored on the production hosts.

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The production hosts (130) may be other types of computing devices without departing from the invention. For additional details regarding computing devices, See FIG. 8.

In one or more embodiments of the invention, the production hosts (130) are distributed computing devices. As used herein, a distributed computing device refers to functionality provided by a logical device that utilizes the computing resources of one or more separate and/or distinct computing devices. For example, in one or more embodiments of the invention, the production hosts (130) may be distributed devices that include components distributed across a number of separate and/or distinct computing devices. In such a scenario, the functionality of the production hosts (130) may be performed by multiple different computing devices without departing from the invention.

In one or more embodiments of the invention, the production hosts (130) host virtual machines. The production hosts (130) may host any number of virtual machines without departing from the invention. The production hosts (130) may also host agents, or other executing components, for orchestrating the operation of the hosted virtual machines. For additional details regarding the production hosts (130), See FIG. 2.

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of remote agents (110) described in this application and all, or a portion thereof, of the methods illustrated in FIGS. 6A-6D. The remote agents (110) may be other types of computing devices without departing from the invention. For additional details regarding computing devices, See FIG. 8.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) may be distributed devices that include components distributed across a number of separate and/or distinct computing devices. In such a scenario, the functionality of the remote agents (110) may be performed by multiple different computing devices without departing from the invention.

In one or more embodiments of the invention, the remote agents (110) provide services to virtual machines. The services may include storing virtual machine data, generating backups of the virtual machines, and/or performing restorations of virtual machines.

In one or more embodiments of the invention, the services include orchestrating batch backups. A batch backup may be a backup of multiple virtual machines executing on the production hosts. The remote agents (110) may monitor the results of a batch backup. In the event of a batch backup failure, e.g., the failure to generate one or more backups as part of the batch backup, the remote agents (110) may automatically take action to remediate the failures. The backup generation failures may be remediated by automatically rescheduling backup generations for the failed backups and/or modifying backup policies to take into account the backup generation failures. As will be discussed in more detail below, backup policies may govern the workflows performed for generating a backup. By modifying the backup policies in response to batch backup failure, the remote agents (110) may ensure the continuity of generated backups. By ensuring continuity of the backups, all of the backups stored in backup storage may be used for restoration purposes, e.g., restoring a virtual machine to a previous state. For additional details regarding remote agents, See FIG. 3.

Additionally, while the remote agents (110) have been described as being separate from the production hosts (130), the remote agents (110) may be executing on the production hosts (130) without departing from the invention. In such a scenario, a batch backup may be distributed across any number of production hosts (130). In one or more embodiments of the invention, the production hosts (130) may be members of a single cluster, i.e., a distributed computing environment with high speed interconnects between compute nodes that operate as production hosts.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 6A-6D. For additional details regarding computing devices, See FIG. 8.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across a number of separate and/or distinct computing devices. In such a scenario, the functionality of the backup storages (120) may be performed by multiple different computing devices without departing from the invention.

In one or more embodiments of the invention, the backup storages (120) store data from the production hosts (130). The data may be, for example, backups of virtual machines. In one or more embodiments of the invention, a backup of a virtual machine is a data structure that reflects a state of a virtual machine at a predetermined point in time or changes to a state over a period of time. For example, a backup of a virtual machine may be an image of the virtual machine, a differencing disk of the virtual machine, a log of an application executing on the virtual machine, or other types of data structures. An image of a virtual machine may include all of the virtual machine data at a point in time. A differencing disk may be the changes made to virtual machine data over a period of time. A log may be changes made to application data made over a period of time. The backup of a virtual machine may be other types of data structures that may be used to restore a virtual machine to a previous state without departing from the invention.

Multiple backups of varying types may be used to restore a virtual machine to a previous state. For example, a virtual machine image may be used to restore a virtual machine to a state of the virtual machine at the time the image was generated. In another example, a virtual machine image and a differencing disk for a period of time immediately following the point in time associated with the image may be used to restore a virtual machine to a state of the virtual machine at the end of the period of time following the point in time.

In such a scenario, the virtual machine image and differencing disk may form a continuity chain. In one or more embodiments of the invention, a continuity chain is a number of backups that are each associated with different periods of time that form a continuous lineage, e.g., the periods of time associated with the backups cover a continuous portion of a timeline. For example, a first backup may be associated with May 12 and a second backup may be associated with May 13-May 17. Thus, the combination of the first backup and the second backup cover the period of May 12-May 17. The backups may be used to restore the virtual machine to any point in time between May 12 and May 17. The backup storages (120) may store additional or different data from backups of virtual machines without departing from the invention.

In one or more embodiments of the invention, only certain combinations of different backups may be usable. For example, differencing disks and/or log backups may only represent changes to a virtual machine over time, not the actual state of the virtual machine at any point in time. Accordingly, differencing disks and/or log backups may only be usable in combination with a virtual machine image for restoration purposes.

As will be discussed below in greater detail, below, an analysis of the continuity chain for a particular virtual machine may be performed to identify whether a backup failure requires one or more remediation actions to be performed to ensure continuity of the continuity chain. These remediation actions may include generating unscheduled backups and/or modifying backup policies to perform different workflows in the future.

In one or more embodiments of the invention the backup storages (120) are deduplicated storages. A deduplicated storage may attempt to increase the quantity of data that it can store by only storing copies of unique data. When storing data in a deduplicated storage, the data may first be checked to determine whether it is duplicative of data already stored in the backup storage. Only the unique portions of the data may be stored in the backup storage. Storing and accessing data in a deduplicated storage may be significantly more computing resource costly than storing data in a non-deduplicated storage. For additional details regarding backup storages, See FIGS. 4-5.

As discussed above, the backup storages may store data obtained from the production hosts (130). FIG. 2 shows a diagram of an example production host (200) in accordance with one or more embodiments of the invention.

In one or more embodiments of the invention, the example production host (200) hosts virtual machines (210). The example production host (200) may host any number of virtual machines (210A, 210N) without departing from the invention.

In one or more embodiments of the invention, the virtual machines (210) execute using computing resources of the example production host (200). For example, each of the virtual machines (210) may be allocated a portion of the processing resources, memory resources, and/or storage resources of the example production host (200).

In one or more embodiments of the invention, an image of each of the virtual machines (210) at points in time in the past may be stored, i.e., stored locally on a production host hosting the respective virtual machine. Following the points in time in the past, a differencing disk that stores each of the changes made from the image of each of the virtual machines (210) may be stored. The aforementioned images and differencing disks may be stored locally or in a backup storage.

In one or more embodiments of the invention, logs associated with applications hosted by the virtual machines (210) may be generated. A log may reflect changes to application data. Logs may be used in combination with virtual machine images and/or differencing disks to restore virtual machines to predetermined states and/or applications to predetermined states.

In one or more embodiments of the invention, generating a backup of a virtual machine includes storing a copy of the image of the virtual machine, a differencing disk, and/or a log of one or more applications hosted by the virtual machine in a backup storage. Thus, when performing a restoration of a virtual machine, the differencing disks and/or logs may be merged with a virtual machine image to obtain a representation of the virtual machine and/or application at the point in time following the periods of time reflected by each of the differencing disks and/or logs.

In one or more embodiments of the invention, the example production host (200) includes a hypervisor (220) that manages the execution of the virtual machines (210). The hypervisor (220) may instantiate and/or terminate any of the virtual machines (210).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The example production host (200) may include a production agent (230) that manages the storage of virtual machine data, e.g., images, differencing disks, and logs, in a backup storage. The production agent (230) may issue commands to the hypervisor (220) to control the operation of a virtual machine when attempting to store virtual machine data. For example, the production agent (230) may initiate the processes of generating a backup package, i.e., data that reflects a state of an entity and enables the entity to be restored to the state, for a virtual machine, an application, or other entity executing on the example production host (200). Similarly, the production agent (230) may initiate restorations of virtual machines, applications, or other entities.

In one or more embodiments of the invention, the production agent (230) may orchestrate a batch backup in response to a request from a remote agent. The production agent (230) may sequentially and/or in parallel orchestrate the generation of backups of multiple virtual machines as part of the batch backup. In some cases, due to hardware failure, software failure, or other causes, a batch backup may terminate unexpectedly. In that case, some backups that were scheduled to be generated as part of the batch backup may not be generated. As will be discussed in greater detail below, one or more embodiments of the invention may automatically transfer the backup generation to other production hosts in the event of a backup generation failure.

In one or more embodiments of the invention, the production agent (230) is a hardened entity, i.e., not modifiable by an entity that is remote to a production host on which the production agent (230) is executing. The production agent (230) may have a set, finite number of predefined functions that may be invoked by a remote entity. In one or more embodiments of the invention, the production agent (230) is not configurable by modifying settings or associated configuration files via a remote terminal or other configuration utility.

In one or more embodiments of the invention, the production agent (230) is a hardware device including circuitry. The production agent (230) may be, for example, digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be hardware processor including circuitry such as, for example, a central processing unit or a microcontroller. The processor may be other types of hardware devices for processing digital information without departing from the invention.

When generating a backup or performing a restoration of a virtual machine, a remote agent may store or access data in a backup storage. FIG. 3 shows a diagram of an example remote agent (300) in accordance with one or more embodiments of the invention. The example remote agent (300) may include a storage manager (310), a batch validator (315), and a persistent storage (320). Each component of the example remote agent (300) is discussed below.

In one or more embodiments of the invention, the storage manager (310) is a hardware device including circuitry. The storage manager (310) may be, for example, digital signal processor, a field programmable gate array, or an application specific integrated circuit. The storage manager (310) may be other types of hardware devices without departing from the invention.

In one or more embodiments of the invention, the storage manager (310) is implemented as computing code stored on a persistent storage that when executed by a processor performs the functionality of the storage manager (310). The processor may be hardware processor including circuitry such as, for example, a central processing unit or a microcontroller. The processor may be other types of hardware devices for processing digital information without departing from the invention.

In one or more embodiments of the invention, the storage manager (310) performs backup and restoration workflows governed by policies stored in the backup/restoration policy repository (320A). In other words, the storage manager (310) may perform a series of steps specified by policies of the backup/restoration policy repository (320A) to complete a backup or restoration workflow.

In one or more embodiments of the invention, the storage manager (310) performs backup workflows that batch together multiple to-be-generated backups, e.g., a batch backup, into a single workflow. The batch backup may be performed in response to explicit instructions, e.g., a backup policy that specifies the grouping of multiple backup generations into a batch operation, or dynamically by aggregating together multiple workflows into a single batch, e.g., aggregating the steps of multiple backup generations into a batch. The storage manager (310) may automatically batch multiple backup generations based on time periods in which the backups are to be generated, e.g., time periods specified by policies of the backup/restoration policies (320A). To provide the aforementioned functionality, the storage manager (310) may perform all, or portion, of the methods illustrated in FIGS. 6A-6D.

In one or more embodiments of the invention, the batch validator (315) is a hardware device including circuitry. The batch validator (315) may be, for example, digital signal processor, a field programmable gate array, or an application specific integrated circuit. The batch validator (315) may be other types of hardware devices without departing from the invention.

In one or more embodiments of the invention, the batch validator (315) is implemented as computing code stored on a persistent storage that when executed by a processor performs the functionality of the batch validator (315). The processor may be hardware processor including circuitry such as, for example, a central processing unit or a microcontroller. The processor may be other types of hardware devices for processing digital information without departing from the invention.

In one or more embodiments of the invention, the batch validator (315) identifies whether all backups to be generated as part of a batch backup were generated. The batch validator (315) may do so by performing a batch level continuity analysis. When a batch backup failure is identified, the batch validator (315) may remediate the failure. To provide the aforementioned functionality, the batch validator (315) may perform all, or portion, of the methods illustrated in FIGS. 6A-6D.

In one or more embodiments of the invention, the persistent storage (320) is a storage device that stores data structures. The persistent storage (320) may be a physical or virtual device. For example, the persistent storage (320) may include hard disk drives drives, solid state drives, tape drives, and other components to provide data storage functionality. Alternatively, the persistent storage (320) may be a virtual device that utilizes the physical computing resources of other components to provide data storage functionality.

The data structures stored by the persistent storage (320) may include backup/restoration policies (320A) and virtual machine priority (320B). Each of the aforementioned data structures is discussed below.

The backup/restoration policy repository (320A) may specify workflows for backup or restoration purposes. The workflows may specify that actions to be performed to generate a backup or restore a virtual machine. In one or more embodiments of the invention, the backup/restoration policy repository (320A) includes policies that specify different workflows. Each of the policies may be associated with different virtual machines, different data, or other portions of the production hosts.

In one or more embodiments of the invention, a portion of the workflows are batch backups. The batch backups may specify workflows for generating backups of any number of virtual machines or other entities as part of a batch. For additional details regarding backup/restoration policies, See, FIG. 5.

The virtual machine priority (320B) may specify a priority of each virtual machine of the system. The virtual machine priority (320B) may enable more important virtual machines to be discriminated from less important virtual machines. The priories specified by the virtual machine priority (320B) may be relative with respect to other virtual machines or absolute. The virtual machine priority (320B) may enable one or more embodiments of the invention to efficiently marshal limited computing resources to those entities that are the most important.

While illustrated as being stored in the example remote agent (300) and as separate structures, the aforementioned data structures may be stored in other locations, distributed across multiple computing devices, divided into any number of data structures, or combined with each other or any other data structures without departing from the invention. Additionally, the persistent storage (320) may store additional, different, or less data without departing from the invention.

When generating a backup or performing a restoration of a virtual machine, a remote agent may store or access data in a backup storage. FIG. 4 shows a diagram of an example backup storage (400) in accordance with one or more embodiments of the invention. The example backup storage (400) may store backup data associated with virtual machines. To provide the aforementioned functionality, the example backup storage (400) may include a persistent storage (401).

In one or more embodiments of the invention, the persistent storage (401) is a storage device that stores data structures. The persistent storage (401) may be a physical or virtual device. For example, the persistent storage (401) may include solid state drives, solid state drives, tape drives, and other components to provide data storage functionality. Alternatively, the persistent storage (401) may be a virtual device that utilizes the physical computing resources of other components to provide data storage functionality.

The data structures stored by the persistent storage (401) may include virtual machine instance backup data (e.g., 402, 405). The persistent storage (401) may include any number of such data structures. Each of the aforementioned data structures may be associated with a respective virtual machine of the system of FIG. 1.

In one or more embodiments of the invention, each virtual machine instance backup data (e.g., 402) includes any number of backups (e.g., 402A, 402N). The backups may be of different types, e.g., virtual machine images, differencing disks, log backups, etc. The backups may be usable in combination, or individually, for restoration purposes.

To further clarify embodiments of the invention, examples of a data structure used by the system of FIG. 1 is illustrated in FIG. 5. FIG. 5 shows a diagram of an example backup/restoration policies (500). The example backup/restoration policies may include any number of policies (501, 505). Each of the policies may include virtual machine identifiers (501A) that identify virtual machines to which the respective policy applies. In some cases, a policy may only apply to a single virtual machine. Each of the policies may also include a workflow (501B). The workflow of each policy may be different. Some workflows may specify a series of steps for generating a backup, a series of steps for generating multiple backups as part of a batch, and/or a series of steps for performing a restoration.

In one or more embodiments of the invention, a backup workflow specifies a target entity, e.g., a virtual machine, an application, etc., a storage location for the generated backup, and other parameters for the workflow. Any number of steps and/or parameters of a workflow may be specified by the backup workflow without departing from the invention.

While the data structure of FIG. 5 has been illustrated a separate data structure including a list of policies, the aforementioned data structure may be combined with other data, may be stored in other formats, may be divided into multiple data structures, and/or portion of the data structure may be distributed across multiple computing devices without departing from the invention.

As discussed above, components of the system of FIG. 1 may perform methods of generating and storing backups as well as performing garbage collection on the stored backups, in addition to other functions. FIGS. 6A-7 show methods in accordance with one or more embodiments of the invention that may be performed by components of the system of FIG. 1.

FIG. 6A shows a flowchart of a method in accordance with one or more embodiments of the invention. The method depicted in FIG. 6A may be used to generate backups in accordance with one or more embodiments of the invention. The method shown in FIG. 6A may be performed by, for example, a remote agent (e.g., 110, FIG. 1). Other components of the system illustrated in FIG. 1 may perform the method of FIG. 6A without departing from the invention.

In Step 600, the end of a backup generation session is identified.

In one or more embodiments of the invention, the backup session is a batch backup session. The end of the backup generation session may be identified based on a period of time from the start of the backup generation session elapsing.

In one or more embodiments of the invention, the backup generation session is a failed session, e.g., one or more backups scheduled to be generated were not generated during the backup session.

In Step 602, it is determined whether the backup generation session is a batch backup session.

In one or more embodiments of the invention, whether the backup generation session is a batch backup session is identified based on a type of the backup generation session that was initiated. As discussed with respect to, for example, FIG. 3 different types of backup generation sessions may be of different types, e.g., single backup generation or a batch of single backup generation sessions. Different policies that govern backup generation workflows may indicate the type of backup generation session.

If the backup generation session is a batch backup, the method may proceed to Step 604. If the backup generation session is not a batch backup session, the method may proceed to Step 610.

In Step 604, a batch level continuity analysis is performed to identify backup failures.

In one or more embodiments of the invention, the backup failures include all backups that were scheduled to be generated during the backup generation session but were not actually generation.

In one or more embodiments of the invention, the batch level continuity analysis may be performed via the method illustrated in FIG. 6B. Other methods of performing a batch level continuity analysis may be used without departing from the invention.

In Step 606, an unscheduled batch backup is performed based on the identified batch backup failures.

In one or more embodiments of the invention, the unscheduled batch backup may be performed by generating a new backup policy that initiates the unscheduled batch backup. The new backup policy may specify that a backup for each of the virtual machines for which backups were scheduled to be generated but were not generated during the backup generation is to be generated at a predetermined time. The predetermined time may be immediately.

In one or more embodiments of the invention, the virtual machines or other entities implicated by the new backup policy may be migrated to other production hosts. Migrating the virtual machines or other entities implicated by the new backup policy may improve the likelihood of successful generation of backups for these entities in the future. In one or more embodiments of the invention, an entity is migrated by moving its storage resources, e.g., virtual machine image, differencing disk, etc., and executing resources, e.g., processes, threads, etc., to another production host. In such a scenario, the backup may be generated by another production host that hosts the entity after the migration, rather than the production host that hosted the entity at the time the backup failure was identified.

In one or more embodiments of the invention, the unscheduled batch backup is performed via the method illustrated in FIG. 6C. The unscheduled batch backup may be performed via other methods without departing from the invention.

In Step 608, backup policies are remediated based on the identified backup failures to ensure backup continuity.

In one or more embodiments of the invention, remediating the backup policies modifies at least one of the backup policies for a virtual machine impacted by the identified backup failures. The modification may change a type of the backup that is specified as to be generated based on the at least one of the backup policies.

Remediating the backup policies may reduce the likelihood or eliminate backups that are unusable for restoration purposes from being generate during future backup generation sessions or batch backup generation sessions.

In one or more embodiments of the invention, the backup policies are remediated via the method illustrated in FIG. 6D. The backup policies may be remediated via other methods without departing from the invention.

The method may end following Step 608.

Returning to Step 602, the method may proceed to Step 610 when the backup generation session is not a batch backup generation session.

In Step 610, a gap-filler backup is generated.

In one or more embodiments of the invention, a gap-filler backup is a backup of the same type of backup that was not generated during the backup generation session. For example, if a differencing disk backup was scheduled to be generated during the identified backup generation session of Step 600, a differencing disk backup is generated as the gap-filler backup.

In one or more embodiments of the invention, the gap-filler backup is a backup of a different type of backup than that was scheduled to be was not generated during the backup generation session.

In one or more embodiments of the invention, the different type is a higher computing resource backup type than the type that was scheduled to be generated but was not generate during the backup generation session. For example, if a differencing disk was scheduled to be generated during the identified backup generation session, a virtual machine image may be generated as the gap-filled backup. The different type may not be a lower computing resource backup type, e.g., the gap-filler backup may not be a differencing disk when a virtual machine image was scheduled to be generated.

Generating the gap-filler backup may ensure that a continuity chain is maintained as continuous even when a previous backup generation session failed.

The method may end following Step 610.

FIG. 6B shows a flowchart of a method in accordance with one or more embodiments of the invention. The method depicted in FIG. 6B may be used to perform batch level continuity analysis in accordance with one or more embodiments of the invention. The method shown in FIG. 6B may be performed by, for example, a remote agent (e.g., 110, FIG. 1). Other components of the system illustrated in FIG. 1 may perform the method of FIG. 6B without departing from the invention.

In Step 620, an identifier of a first virtual machine for which a backup was not generated during the backup generation session is obtained.

The identifier may be obtained by identifying the backups that were to be generated, the order of generation, and checking a backup storage in the order of generation for corresponding backups until a backup that should have been generated during the backup generation session but was not generated. An identifier of the first virtual machine may be obtained based on an association between the first virtual machine and the backup that should have been generated.

In Step 622, a batch of virtual machines associated with the backup generation session is indexed into using the obtained identifier.

In one or more embodiments of the invention, indexing into the batch of virtual machines is accomplished by identifying a position, within the batch, of the virtual machine identified by the obtained identifier.

In one or more embodiments of the invention, the batch of virtual machines includes those for which backups were to be generated during the backup generation session.

In Step 624, a portion of the batch of virtual machines for which respective backups were not generated during the backup generation session is identified.

As noted above, an order of generation of backup may be specified by a batch backup generation policy. By indexing into the batch of virtual machines, the portion may be identified as all of the virtual machines in the order past the index point.

In Step 626, the identified portion of the batch of virtual machines is used as the identified backup failures, e.g., backups for which failure is assumed by virtue of the lack of a backup being present in backup storage or other storage location.

The method may end following Step 626.

FIG. 6C shows a flowchart of a method in accordance with one or more embodiments of the invention. The method depicted in FIG. 6C may be used to perform an unscheduled batch backup in accordance with one or more embodiments of the invention. The method shown in FIG. 6C may be performed by, for example, a remote agent (e.g., 110, FIG. 1). Other components of the system illustrated in FIG. 1 may perform the method of FIG. 6C without departing from the invention.

In Step 630, a set of virtual machines associated with the identified backup failures is identified.

In one or more embodiments of the invention, the set of virtual machines may be identified using the policy that triggered the backup generation session. The policy may specify all virtual machines that were to be generated during the backup generation session. Those for which backup were not generated may be identified as the set of virtual machines.

In Step 632, the set of virtual machines is ordered based on the priority of each virtual machines.

In one or more embodiments of the invention, the set of virtual machines are ordered using priorities stored in memory. Ordering the set of virtual machines may reorganize the order from that specified by the policy that triggered the backup generation session.

In Step 634, it is determined whether sufficient computing resources are available for performing the unscheduled batch backup.

In one or more embodiments of the invention, the determination is made by comparing the available computing resources of a production host that will generate the backups to an estimate of the computing resources required for performing the unscheduled batch backup. The estimate may be generated based on the quantity of data to be backed up, a level of deduplication of the backup storage, and/or other factors. If the estimate exceeds the available computing resources, the computing resources are determined as insufficient.

If it is determined that there are sufficient computing resources, the method proceeds to Step 638. If it is determined that there are insufficient computing resources, the method proceeds to Step 636.

In Step 636, the computing resource cost of generating backups for the ordered set of virtual machine is reduced.

In one or more embodiments of the invention, the computing resource cost is reduced by changing a type of each backup for the ordered set of virtual machines to a lower computing resource cost backup, e.g., differencing disk generated instead of virtual machine image.

In one or more embodiments of the invention, the computing resource cost is reduced by changing a storage location for the backups, e.g., a different backup storage with a lower amount or not deduplication.

In Step 638, the batch backup for the ordered set of virtual machines is performed.

In one or more embodiments of the invention, the batch backup is performed via workflows governed by policies, e.g., each backup is performed based on the parameters and/or specified steps specified by the policies or each virtual machine of the ordered set of virtual machines. In other words, when there are sufficient computing resources available, the workflows may be governed by the policies.

In one or more embodiments of the invention, the batch backup is performed via workflows governed by policies and modified by the reduced computing resource cost backups. In other words, the workflows for generating the backups may be the same as those specified by the policies but modified to meet the requirements of the reduced computing resource cost backups of Step 636.

The method may end following Step 638.

FIG. 6D shows a flowchart of a method in accordance with one or more embodiments of the invention. The method depicted in FIG. 6D may be used to remediate backup policies in accordance with one or more embodiments of the invention. The method shown in FIG. 6D may be performed by, for example, a remote agent (e.g., 110, FIG. 1). Other components of the system illustrated in FIG. 1 may perform the method of FIG. 6D without departing from the invention.

In Step 640, for each backup generated during the unscheduled batch backup, corresponding backup data stored in backup storage is identified.

In Step 642, a continuity chain analysis of the corresponding backup data is performed for each generated backup.

In one or more embodiments of the invention, performing a continuity chain analysis includes identifying all policies that will the generation of backups in the future for a virtual machine that is associated with the continuity chain, comparing the type of each to-be-generated backup to a type immediately adjacent in the chain, and identifying any future backups that will not be usable for restoration purposes. The unusable backups may be identified based on a type mismatch between the to-be-generated backup and the type immediately adjacent in the chain, e.g., a differencing disk cannot depend on a log backup.

In Step 644, backup policies associated with the corresponding backup data are modified based on the continuity chain analysis to maintain future continuity of the backup data.

In one or more embodiments of the invention, the backup policies are modified to prevent an improper mismatch between future-generated backups.

The method may end following Step 644.

While the methods illustrated in FIG. 6A-6D are illustrated as a series of steps, the steps may be performed in a different order, steps may be omitted, or any number of steps may be performed in parallel without departing from the invention.

To further clarify embodiments of the invention, a non-limiting example is provided in FIGS. 7A-7C. In the following example, a system similar to FIG. 1 is implemented. For the sake of brevity, only a portion of the components of FIG. 1 are illustrated in FIGS. 7A-7C.

EXAMPLE

Consider a scenario in which a production host (700) hosts four virtual machines (702) as illustrated in FIG. 7A. To provide restoration services to the production host (700), backups of the virtual machines (702) may be generated and stored in backup storage.

FIG. 7B shows a diagram of a backup storage (710) hosting backup data (712, 714, 716, 718) for the virtual machines. Each backup includes a number of different backups (e.g., 712A, 714N). Each of the backups may be of varying types. The backups may be useable in combination, or isolation, for restoration purposes.

However, during the last batch backup generation session for the virtual machines of FIG. 7A, the batch backup generation session terminated abnormally due to a corruption of the production agent (e.g., 230, FIG. 2) which resulted in missing backups (720) in the backup data for two virtual machines (e.g., 716, 718). Backup policies for both virtual machine A and virtual machine B indicate that differencing disks backups should have been generated during the batch backup generation session.

In response to this backup generation failure, a remote agent (not shown) performs the methods illustrated in FIGS. 6A-6D. Via the methods, a virtual machine image (722) is generated and stored in backup storage as part of the backup data (716) for virtual machine C as illustrated in FIG. 7C. A virtual machine image was generated because it was determined that other backup types could not be used in combination with existing backups for restoration purposes. Accordingly, the type of generated backup was dynamically changed to a type that can be used independently of other backups for restoration purposes, e.g., a virtual machine image. By doing so, the system ensured that future generated backups will be useful for restoration purposes thereby improving the integrity of data stored in the system.

In contrast, only a differencing disk (724) was generated for virtual machine D because it was determined that other backups in the continuity chain could be used in combination with the differencing disk (724) for restoration purposes. By doing so, the system ensured that future generated backups will be useful for restoration purposes while also minimizing the computing resource cost of generating the backups.

While not illustrated in FIGS. 7A-7C, the two virtual machines (716, 718) may be moved to other production hosts in the event that a backup failure is detected. Doing so may improve the likelihood of generating remedial backups.

End of Example

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

One or more embodiments of the invention may provide an improved distributing computing environment that is less susceptible to component failure. By ensuring continuity of generated backups, embodiments of the invention may decrease the likelihood that generated backups are unusable and that components of the system, e.g., virtual machines, may not be restorable to previous states that were believed to be restorable to previous states.

Additionally, one or more embodiments of the invention may provide an improved process for generation of a backup of an entity, e.g., virtual machine, application, etc. One or more embodiments may provide a backup generation process that is less susceptible to component failure. For example, embodiments of the invention may ensure that backups are available for restoration purposes. By performing a continuity chain analysis, components remote from where a failure occur automatically identify the failure and take action to remediate the failure. Thus, embodiments of the invention may improve the process of backup generation within a distributed environment where remote components of the system would otherwise be unaware and unable to take action to remediate backup generation failures.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An agent for managing virtual machines, comprising:
   a persistent storage that stores backup/restoration policies; and
   a processor programmed to:
   identify an end of a backup generation session for the virtual machines;
   make a first determination that the backup generation session was a batch type backup session;
   in response to the first determination:
      perform a batch level continuity analysis of backups generated via the backup generation session to identify a set of backup failures of the backup generation session;
      perform an unscheduled batch backup generation session based on the identified set of backup failures; and
      remediate the backup/restoration policies using the identified set of backup failures to ensure backup continuity of all backups associated with each of the virtual machines by:
         for each backup generated during the unscheduled batch backup generation session:
            identify corresponding backup data stored in backup storage;
            perform a continuity chain analysis of the corresponding backup data; and
            modify the backup/restoration policies associated with the corresponding backup data based on the continuity chain analysis to maintain future continuity of the corresponding backup data.

2. The agent of claim 1, wherein performing the unscheduled batch backup generation session based on the identified set of backup failures comprises:
   identifying a subset of a set of the virtual machines associated with the identified set of backup failures; and
   ordering the subset of the set of the virtual machines based on a priority of each respective virtual machine of the subset.

3. The agent of claim 2, wherein performing the unscheduled batch backup generation session based on the identified set of backup failures further comprises:
   generating backups associated with respective virtual machines of the subset of the set of the virtual machines based on the ordering of the subset of the set of the virtual machines.

4. The agent of claim 3, wherein performing the unscheduled batch backup generation session based on the identified set of backup failures further comprises:
   making a second determination that a production host hosting the subset of the set of the virtual machines does not have sufficient computing resources based on the priority of each respective virtual machine of the subset; and
   in response to the second determination:
      reducing a computing resource deficit of performing the unscheduled batch backup generation session; and
      performing the reduced computing resource cost unscheduled batch backup generation session to generating a number of backups corresponding to respective backup failures of the identified set of backup failures.

5. The agent of claim 4, wherein reducing the computing resource deficit of performing the unscheduled batch backup generation session comprises:
   modifying a type of a backup to be generated during the reduced computing resource cost unscheduled batch backup generation session.

6. The agent of claim 4, wherein reducing the computing resource deficit of performing the unscheduled batch backup generation session comprises:
   modifying a time period during which the reduced computing resource cost unscheduled batch backup generation session is performed,
   wherein the time period is modified to be concurrent with a high computing resource availability period of the production host.

7. The agent of claim 1, wherein performing the batch level continuity analysis of the backups generated via the backup generation session to identify the set of backup failures of the backup generation session comprises:
   obtaining an identifier of a virtual machine of the virtual machines for which a backup was not generated during the backup generation session;
   indexing into a batch of virtual machines associated with the backup generation session using the obtained identifier;

identifying a portion of the batch of virtual machines for which respective backups were not generated during the backup generation session; and using the identified portion of the batch of virtual machines as the identified set of backup failures.

8. The agent of claim 1, wherein modifying the backup/restoration policies associated with the corresponding backup data based on the continuity chain analysis to maintain future continuity of the corresponding backup data comprises:

identifying an order-reduced backup of the backups generated during the unscheduled batch backup;

identifying a backup policy of the backup/restoration policies associated with the order-reduced backup; and modifying the identified backup policy to generate a future backup that is compatible with the order-reduced backup of the backups generated during the unscheduled batch backup.

9. The agent of claim 1, wherein the virtual machines are hosted by a production host separate from the agent.

10. The agent of claim 1, wherein the backups generated via the backup generation session are stored in a backup storage separate from the agent.

11. The agent of claim 1, wherein each policy of the backup/restoration policies is associated with a respective virtual machine of the virtual machines.

12. The agent of claim 11, wherein each policy of the backup/restoration policies comprises a workflow for backup/restoration generation, wherein the workflow specifies at least one from a group consisting of a storage location, an identifier of one of the virtual machines, and a schedule.

13. The agent of claim 1, wherein backup continuity of all backups associated with a virtual machine of the virtual machines enables the virtual machine to be restored to previous states associated with any backup associated with the virtual machine of the virtual machines stored in backup storage.

14. The agent of claim 1, wherein the batch type backup session is initiated by sending an instruction to a production agent executing on a production host that a portion of the virtual machines.

15. The agent of claim 1, wherein the unscheduled batch backup generation session is not initiated by any policy of the backup/restoration policies.

16. A method for managing virtual machines, comprising:

identifying an end of a backup generation session for the virtual machines;

making a first determination that the backup generation session was a batch type backup session;

in response to the first determination:

performing a batch level continuity analysis of backups generated via the backup generation session to identify a set of backup failures of the backup generation session;

performing an unscheduled batch backup generation session based on the identified set of backup failures; and remediating backup/restoration policies using the identified set of backup failures to ensure backup continuity of all backups associated with each of the virtual machines by:

for each backup generated during the unscheduled batch backup generation session:

identifying corresponding backup data stored in backup storage;

performing a continuity chain analysis of the corresponding backup data; and modifying the backup/restoration policies associated with the corresponding backup data based on the continuity chain analysis to maintain future continuity of the corresponding backup data.

17. The method of claim 16, wherein the unscheduled batch backup generation session is not initiated by any policy of the backup/restoration policies.

18. A non-transitory computer readable medium comprising computer readable program code, which when executed by a computer processor enables the computer processor to perform a method for managing virtual machines, the method comprising:

identifying an end of a backup generation session for the virtual machines;

making a first determination that the backup generation session was a batch type backup session;

in response to the first determination:

performing a batch level continuity analysis of backups generated via the backup generation session to identify a set of backup failures of the backup generation session;

performing an unscheduled batch backup generation session based on the identified set of backup failures; and remediating backup/restoration policies using the identified set of backup failures to ensure backup continuity of all backups associated with each of the virtual machines by:

for each backup generated during the unscheduled batch backup generation session:

identifying corresponding backup data stored in backup storage;

performing a continuity chain analysis of the corresponding backup data; and modifying the backup/restoration policies associated with the corresponding backup data based on the continuity chain analysis to maintain future continuity of the corresponding backup data.

19. The non-transitory computer readable medium of claim 18, wherein the unscheduled batch backup generation session is not initiated by any policy of the backup/restoration policies.

* * * * *

UNITED STATES PATENT AND TRADEMARK OFFICE
CERTIFICATE OF CORRECTION

PATENT NO. : 10,860,431 B2
APPLICATION NO. : 16/028672
DATED : December 8, 2020
INVENTOR(S) : Upanshu Singhal et al.

Page 1 of 1

It is certified that error appears in the above-identified patent and that said Letters Patent is hereby corrected as shown below:

In the Claims

Column 19, Line 40 in Claim 14, the phrase "production host that a portion" should read
-- production host that hosts a portion --.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*